Aug. 19, 1969  L. FURLANETTO  3,461,494
MANUFACTURE OF WELDING ELECTRODES
Filed Feb. 21, 1967  4 Sheets-Sheet 4

United States Patent Office 3,461,494
Patented Aug. 19, 1969

3,461,494
MANUFACTURE OF WELDING ELECTRODES
Leopoldo Furlanetto, Albisola Mare, Savona, Italy, assignor to La Soudure Electrique Autogene Procedes Arcos, Brussels, Belgium, a corporation of Belgium
Filed Feb. 21, 1967, Ser. No. 617,706
Claims priority, application Italy, Mar. 3, 1966,
15,160/66
Int. Cl. B29f 3/01
U.S. Cl. 18—12                             3 Claims

ABSTRACT OF THE DISCLOSURE

A screw press for making welding electrodes surrounded by a coating paste, having a cylindrical body and a screw with interrupted helical flights, there being opposed pins extending from the interior of the body into recesses at the interruptions, the outer diameter of the screw being substantially twice the diameter of the root, and successive interrupted helical flights being positioned so that when projected on a plane perpendicular to the axis of the screw, the adjacent ends of the successive flights overlap.

Disclosure of invention

The present invention relates to the manufacture of electrodes by extrusion and to the means used for this process.

Up to now, the means used for the manufacture of coated electrodes by extrusion generally consist of hydraulic piston presses and more infrequently, of screw presses.

The great disadvantage of piston presses is that the production is discontinuous. In this procedure, in fact, when the charge has left the cylinder, the latter is replaced by another which in the meantime will have been recharged with paste, and so on. The operations of substituting one cylinder for another thus represent a loss of time which attempts have been made to reduce by decreasing the number of substitution operations, and this comes back to increasing the capacity of the cylinders. The latter can be effected, for example, by increasing the length of the said cylinder, but its length cannot be increased indefinitely. The pressure in the cylinder is in fact transmitted rectilinearly through the paste in the direction in which the piston acts thereon, and it decreases progressively along the cylinder of paste as the distance to the piston becomes greater. It may thus be found too weak to obtain the desired rate of feed if the length of the cylinder is too great. One is then obliged to provide an increase in the diameter of the cylinder, but by doing this, the ratio of the cylinder section to the section of the extrusion aperture is increased at the same time. But this extrusion ratio also cannot be increased indefinitely, since starting from a certain value of the latter, the rate of feed falls and may even become practically nil.

The increase of the feed of the piston press cannot thus exceed a certain limit owing to the fact that, as may be seen, it results in a compromise between the section and the length of the cylinder, which must themselves be limited.

The above should be understood by supposing that the pastes used have first been made perfectly homogeneous, in view of the absence of any possibility of mixing during the extrusion operation. In the absence of this prior condiiton, the silicate would not be perfectly amalgamated with the powder, which would give rise to a serious phenomenon of separation between the liquid and solid parts of the mass during the extrusion operation, with finally the impossibility of continuing the extrusion.

To these drawbacks, it is necessary to add that resulting from the temperature at which the extruded electrodes emerge. In practice, these are cold, which has as a result the subjection of the paste to a minimum drying time during which the paste will be reheated, while taking special precautions in order that this operation may be effected uniformly in depth and along the length of the electrode.

As compared with piston presses, screw presses have the advantage of working without interruption. The output is continuous. Unfortunately, the yields obtained are not satisfactory, especially with certain types of paste.

Among the objects of the invention are to achieve a continuous extrusion capacity equal to or better than a piston press (fifteen or even twenty or more liters per minute); to avoid delay incident to recharging and substituting cylinders in a piston press; to obtain a perfectly homogeneous paste; to promote drying of the coating at an elevated temperature, such as 30° to 45° C.; and to minimize the danger of cracking during drying.

Another object of the invention is to extend the range of extrusion diameter to include 2.5 mm. up to large diameters in the same press; and to obtain higher yields of electrodes of large diameters in spite of the tendency to create a paste of different consistencies at different radial distances in prior art screw presses.

In the present invention the paste is plasticized before being finally extruded through the nozzle, thus making it possible to extrude pastes which could not otherwise be extruded. The screw press of the invention successively mixes, plasticizes, compresses and extrudes the coating paste for welding electrodes. A single helical screw has two parts, one of which has mixing and plasticizing zones in which the threads are cut radially at intervals to the level of the shaft or root in order to form recesses, the helical threads on opposite sides of the cut overlapping one another, and the other part corresponds to a compression zone in which the thread is continuous. Opposed pairs of pins at the recesses in the screw extend radially and have a length which is slightly less than the depths of the recesses. The body and the screw have identical parts of large and small diameters connected by a truncated conical portion. The diameter of the screw is approximately twice the diameter of its shaft, root or shank. The recesses are related to one another and staggered so that the paste undergoes longitudinal movement parallel to the axis of the screw combined with radial movement which causes convection motion of the paste.

The drawings show a particular embodiment of the invention by way of example.

FIGURE 11 is a partial axial section of a variation in the device of the invention, which has two and one-half turns 45 and 46 in opposition to one another at the extremity of the screw near the extrusion nozzle.

Figure 1:
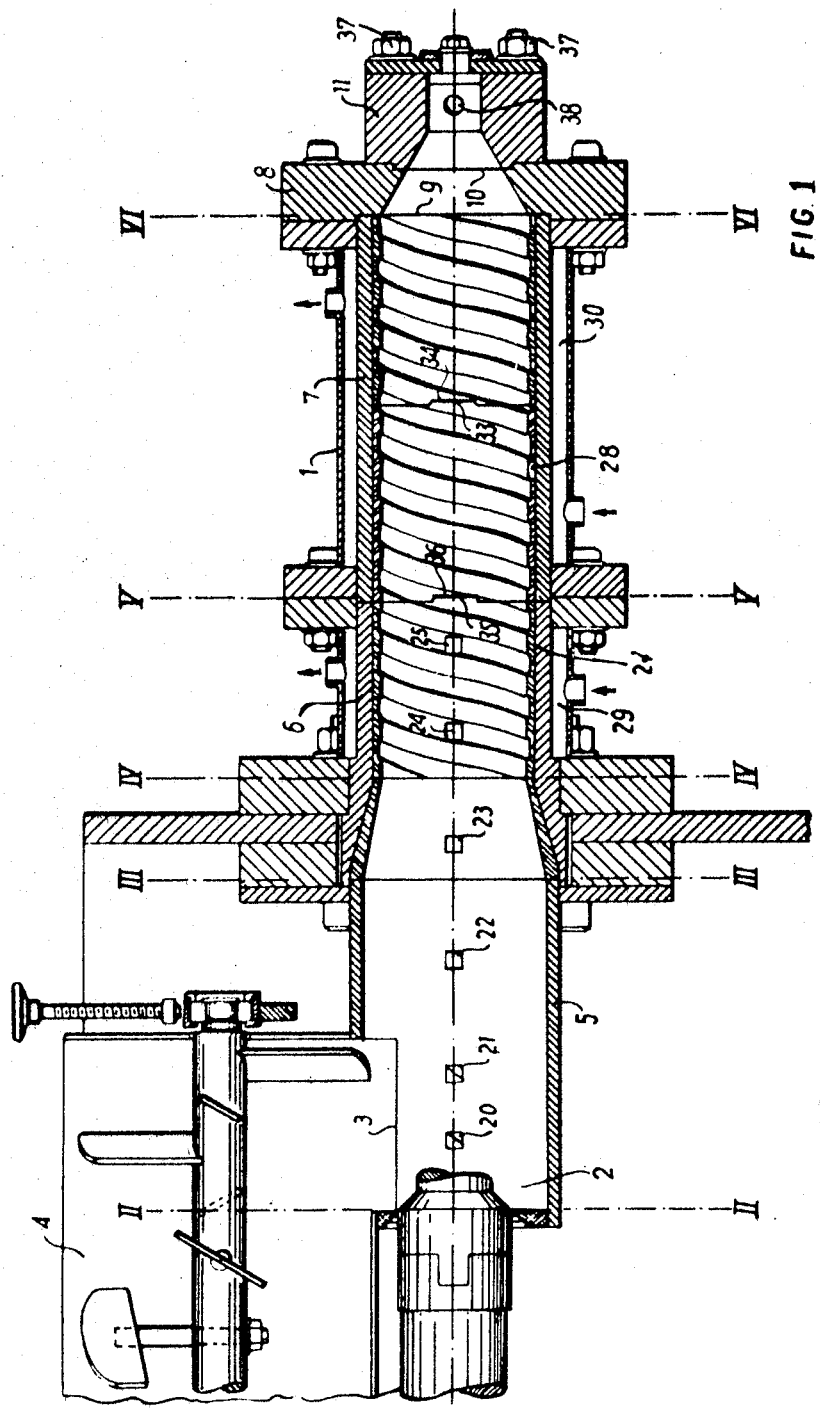
FIGURE 1 is an axial section of the extrusion machine of the invention after removal of the screw.

The press according to the invention comprises a hollow cylindrical body 1 in the shape of a gun (FIGURE 1). It is cut away laterally at one of its extremities 2 so as to be connected with the bottom 3 of the kneader 4 by which the press is provided with paste to be worked.

The body of the press is made up of three coaxial successive sections 5, 6 and 7.

All that part of the body corresponding to nearly a third of its length and receiving the material from the kneader, constitutes the first section 5 and is contained between the transverse shares II—II and III—III. It corresponds to the mixing zone of the paste. From this length the internal diameter of the body decreases progressively from 10 to 15% over a relatively short distance contained between the transverse planes III—III and IV—IV. In this space the mixing is finished and at the same time the operation of plasticising the paste begins. The plasticising is then continued in the extension of this part of the body, that is between the transverse planes IV—IV and V—V, and forms with this last part the second section 6 of the body of the press, which is thus contained between the transverse planes III—III and V—V. The third section constitutes the zone for compression of the paste and extends over nearly two-fifths of the whole length of the body from the transverse plane V—V to the transverse plane VI—VI.

At the other end of the cylinder a metal collar 8 is firmly fixed to the interior wall in the shape of a truncated cone, the large base 9 of which has the same diameter as the diameter of the breech of the compression section to which it is connected on one side, and the small base has the same diameter as the large base of the truncated cone shaped cavity 10 of the head 11 to which it is connected on the other side.

Figure 3:
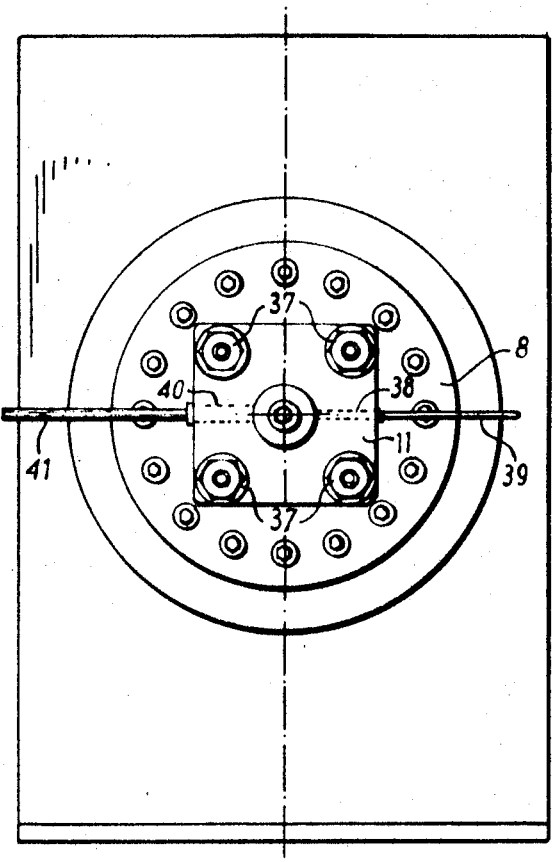
FIGURE 3 is a front elevation.

The head is constituted, in known manner, of a solid annular block 11 fixed firmly to the collar 8 by the four bolts 37, and includes two coaxial passages which are perpendicular to the axis of the annular block, one, 38, being intended for the passage of the metal rods to be coated 39, and the other, 40, for the exit of the coated rods 41 (FIGURE 3).

Figure 2:
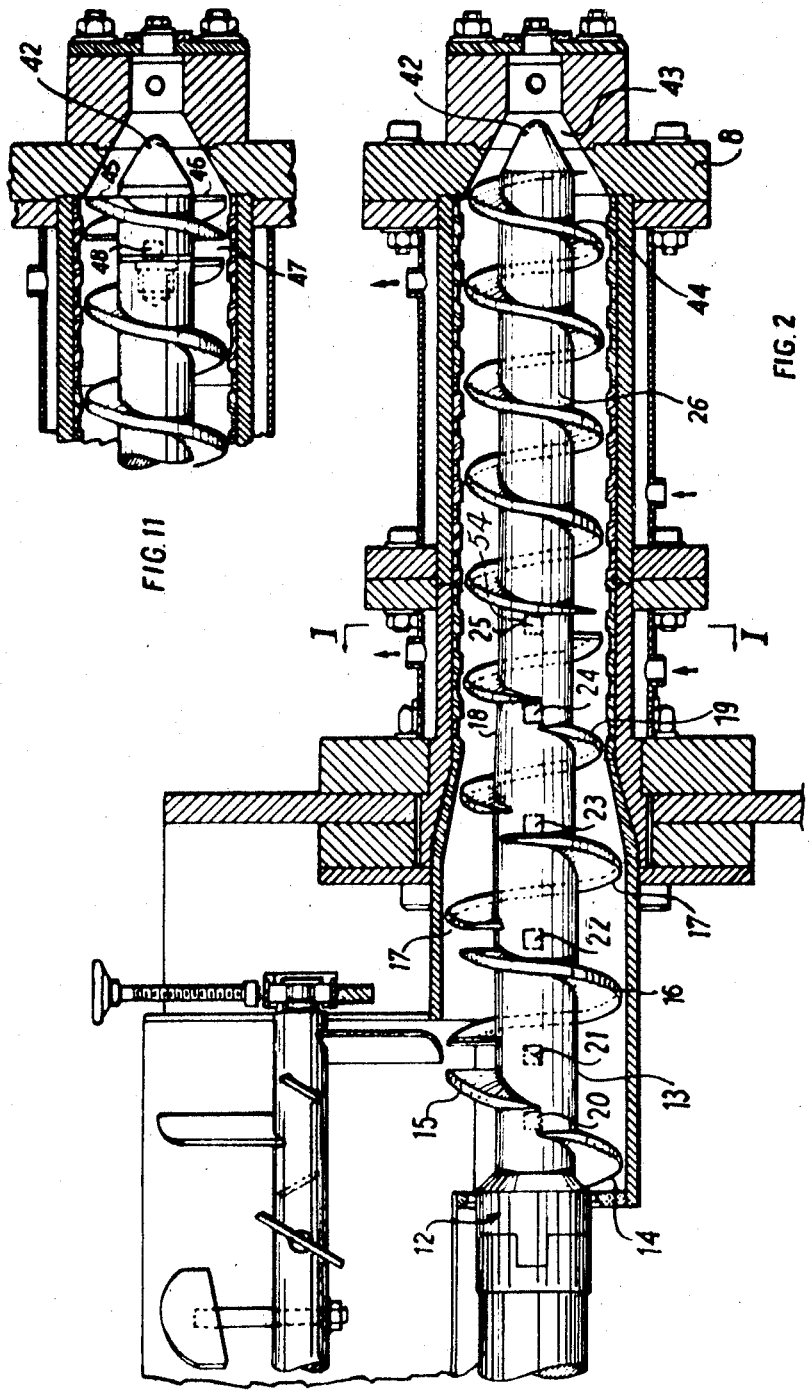
FIGURE 2 is an axial section of the extrusion machine with the screw present.

A long rotor 12 (FIGURE 2) moves inside the body to which the operative zones of the body of the press defined above correspond.

The first, which corresponds to the mixing and pre-plasticising zone, consists of a shaft or root 13 provided with blades in the form of helical turns 14, 15, 16 and 17, wholly or partly of a diameter approximately equal to the diameters corresponding to the part of the interior of the body in which they move.

Figure 4:
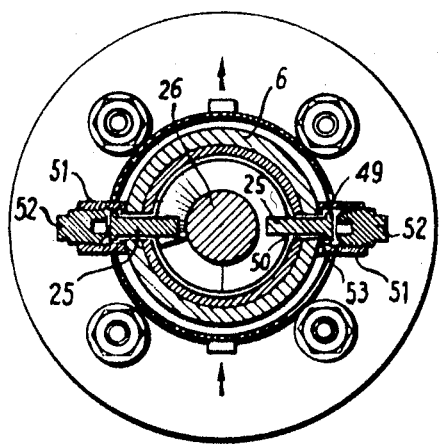
FIGURE 4 is a transverse section on the line I—I of FIGURE 2.
Figure 5:
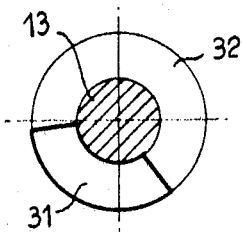
FIGURES 5–10 are projections on a plane perpendicular to the axis of the screw of the machine of the respective successive helical flights of this screw.

The second part of the rotor corresponding to the plasticising operation proper also consists of a shaft or root 18 which is merely the extension of the shaft 13, but has a slightly smaller diameter and is provided with blades and parts of blades 17 and 19 in the form of partial helical turns of which the diameter is less than and approximately equal to the diameter of the parts corresponding to this plasticising zone of the interior of the body in which they move. The blade 17 is of decreasing diameter over a great part of its length on account of its position in the conical space corresponding to the plasticising zone. These blades are separated from each other by a space such that the rotor can move without striking against the pairs of radial pins 20, 21, 22, 23, 24 and 25 fixed perpendicularly and opposite to the breech of the cylindrical body (FIGURES 1 and 4).

The length of the part of these pins which projects into the tunnel is slightly less than the distance between the breech and the shaft of the screw. They are of square section but they may have a rectangular, trapezoidal, circular or elliptic section. They are kept fixed to the body in any known way, for example as shown in FIGURE 4, the pins 25 which are provided at their end with an annular projection 49 pass first through the holes 50 cut in the wall of the cylindrical body 6, arranged in radial opposition. At the exterior openings of the holes are sleeves 51 threaded inside and welded or connected to the body of the cylinder or even making part of it, into which threaded plugs 52 are screwed. These plugs push back the pins towards the interior of the cylinder and are stopped in their displacement by the annular base 53 of the sleeve against which the annular projection 49 of the pin strikes.

The third part of the rotor comprises a blade or flight 54 in the form of a helical turn and a conventional helical screw 26, the shaft of which is an extension of the shaft 18. The end 42 of this shaft is of truncated cone shape and forms an annular truncated cone-shaped space 43 with the interior wall constituted by the interior wall of the collar 8 and of the head 11.

The position of the successive helical flights or blades 14, 15, 16, 17, 19 and 54 on the root or shaft 13 of the screw 12 is such that, when projected upon a plane perpendicular to the axis of the screw the adjacent ends of these successive flights or blades overlap. Thus, FIGURES 5, 6, 7, 8, 9 and 10 represent, by way of example, the projections on a plane perpendicular to the axis of the screw 12 of blades 14, 15, 16, 17, 19 and 54 respectively, each of these projections being designated by the reference numeral 31. Consequently, the annular counter-segments 32 correspond to the spaces of said recesses between these blades. It can be seen that superimposing FIGURE 5 on FIGURE 6, the lower extremities of projection 31 of FIGURE 6 which correspond to the extremity of thread 15, the most distant from the extremity 42 of the screw, overlap the upper extremity of projection 31 in FIGURE 5, corresponding to the extremity of thread 14 which is the closest to the extremity 42 of the screw.

Figure 6:
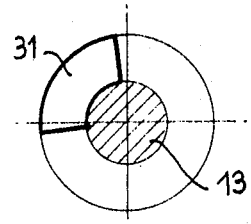
Figure 7:
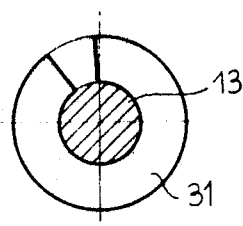
Figure 8:
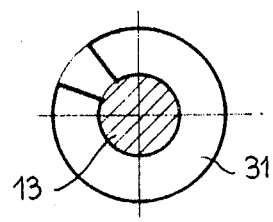
Figure 9:
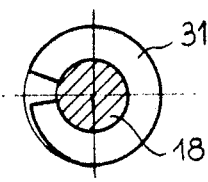
Figure 10:
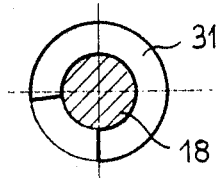

By the same token, superimposing FIGURE 6 on FIGURE 7, it will be seen that the upper extremity of the projection 31 of FIGURE 7, which corresponds to the extremity of thread 16, which is the farthest away from the extremity 42 of the screw, overlaps the upper extremity of the projection 31 in FIGURE 6, corresponding to the extremity of the thread 15 which is closest to the extremity 42 of the screw. Similar analogous relationships can be observed by superimposing FIGURE 7 on FIGURE 8, FIGURE 8 on FIGURE 9, and FIGURE 9 on FIGURE 10.

In a special arrangement of the end 44 of the compression screw, this end is placed so that the two halves of a blade 45 and 46 are fixed there in opposition and are separated from the previous blades by a radial recess 47 to which corresponds a pair of pins 48 fixed on the breech of the body.

In a particular form of the invention, the pitch of the screw can also be decreasing and the decrease, for example, may attain 8%. The number of blades in the part corresponding to the compression zone is preferably 4 or 5. The interior cylindrical walls between the transverse planes IV—IV and VI—VI are lined with interior jacketing containing helical grooves 27 and 28.

The interior grooved jacket 28 lining the inside wall of the third section 7 of the body consists of two sections which are fitted together by projections 33 which enter the recesses 34. These fitted sections are themselves fitted to the jacket 27 of the plasticising zone by the projection 35 which enters the recess 36, in order to prevent them from turning with the screw.

The exterior walls between the same planes IV—IV and VI—VI are surrounded by jackets for the circulation of liquid 29 and 30. The spaces which separate the blades of the recesses are of such dimension with respect to one another and staggered in such a way that they permit the paste to carry out a slow convection movement owing to which the successive operations of mixing and plasticising can be efficiently accomplished.

Owing to its dimensions and the existence of numerous prismatic pins fixed on the jacket, a press of this kind is not quickly dismantled. But in case of change of work, or for reasons which cannot be foreseen, one may have to remove the cylinder and the head easily and replace them by others. For this purpose, the side plate for connecting to the frame must be of sufficient thickness. In some minutes, the extrusion member can be removed by using a carriage ad hoc, and another similar or different extrusion member, according to the type of work to be carried out, may be substituted for it. An extrusion member with a screw of smaller diameter, which is particularly suitable for a rapid extrusion, can be applied to the same frame. The length of the extrusion member having to remain constant at the compression zone will give rise in consequence to an improvement of the plasticisation and consequently will make the extrusion easier.

In an advantageous arrangement of the joining of the cylinders together and with the reducing cone, the contact plates are reinforced in order to support the strain of extrusion especially when the paste is more resistant and to enable elastic deformations and undesirable elongations to be avoided which could give rise to the disappearance of the concordant relation between the pins and the recesses of the screw and hence seizing between the parts which meet.

Suppies of the order of 70 kg. of paste per minute, coating electrodes of 3.25 mm. in diameter, with a screw according to the invention of which the diameter of the tunnel was 250 mm., are considered as normal feed rates for the press according to the invention. But this is not a maximum limit, for the feed rates have risen up to 135 kg. per minute for rods of 8/10 mm. in diameter. In fact, the restriction met with is due less to its own characteristics than to the conditions for the reception of the electrodes fed at the speeds attained or capable of being attained by the said press.

What I claim is:

1. A screw press for extrusion of welding electrodes surrounded by a coating paste, said press comprising a cylindrical body and a screw with helical flights rotatable within the body and having a root, the cylindrical body comprising a first part which is substantially cylindrical and which is intended to receive the material being extruded, a second part which is substantially cylindrical and which has an inner diameter less than the inner diameter of the first part and, between the first and second parts, a truncated part, the first and truncated parts being provided with pairs of opposed pins which are fixed to the inner wall of the body, perpendicularly to the axis of the body, and which have a length slightly less than the distance between the inner wall of the body and the root of the screw, the second part of the body being provided with helical grooves in the inner wall, the screw comprising a first portion which is substantially cylindrical, corresponding to the first part of the body, a second portion which is substantially cylindrical, corresponding to the second part of the body, and a truncated portion corresponding to the truncated part of the body, the outer diameter of the screw being substantially twice the diameter of its root, the first and truncated portions of the screw having successive helical flights which are disposed respectively between the successive pairs of opposite pins, the position of said successive helical flights on the root of the screw being such that, when projected upon a plane perpendicular to the axis of the screw, the adjacent ends of the successive flights overlap, and that the recesses formed between the adjacent ends of the successive flights are staggered from one another around the root of the screw, the second portion of the screw having at least one continuous helical flight extending along the entire second part of the screw.

2. A screw press of claim 1, wherein the continuous helical flight of the second portion of the screw has a pitch which decreases toward the extremity of the second part of the body.

3. A screw press of claim 1, wherein the successive flights of the first and truncated portions of the screw, on the one hand, and the recesses between these flights, on the other hand, are of different lengths.

References Cited

UNITED STATES PATENTS

| | | | |
|---|---|---|---|
| 1,904,884 | 4/1933 | Royle | 18—12 |
| 1,912,374 | 6/1935 | Johnson | 18—12 |
| 2,434,690 | 1/1948 | Ferla. | |
| 2,665,724 | 1/1954 | Lundell | 18—12 X |
| 2,705,343 | 4/1955 | Hendry | 18—12 X |
| 2,765,491 | 10/1956 | Magerkurth | 18—12 |
| 2,787,022 | 4/1957 | Chisholm | 18—12 |
| 2,902,923 | 9/1959 | Stacy | 18—12 |
| 2,991,503 | 7/1961 | Rietz | 18—12 |
| 3,055,074 | 9/1962 | Garvey | 18—12 X |
| 3,123,860 | 3/1964 | Vesilind | 18—12 |
| 3,189,324 | 6/1965 | Gubler | 18—12 X |
| 3,221,369 | 12/1965 | Vesilind | 18—12 |
| 3,224,739 | 12/1965 | Schuur | 18—12 |
| 3,260,774 | 7/1966 | Harlow | 18—12 X |

FOREIGN PATENTS

| | | |
|---|---|---|
| 1,253,488 | 1/1961 | France. |
| 1,029,601 | 5/1966 | Great Britain. |
| 1,058,590 | 2/1967 | Great Britain. |

WILLIAM J. STEPHENSON, Primary Examiner

U.S. Cl. X.R.

25—14